United States Patent [19]
Feigel

[11] Patent Number: 4,633,109
[45] Date of Patent: Dec. 30, 1986

[54] ELECTRONICALLY COMMUTATED, COLLECTORLESS DIRECT-CURRENT MOTOR

[75] Inventor: Josef Feigel, Landshut, Fed. Rep. of Germany

[73] Assignee: Standard Elektrik Lorenz Aktiengesellschaft, Stuttgart, Fed. Rep. of Germany

[21] Appl. No.: 790,548

[22] Filed: Oct. 23, 1985

[30] Foreign Application Priority Data

Oct. 23, 1984 [DE] Fed. Rep. of Germany ....... 3438747

[51] Int. Cl.⁴ ............................................. H02K 37/00
[52] U.S. Cl. .................................. 310/68 R; 310/266; 318/254
[58] Field of Search ................. 310/46, 68 R, 266, 67; 318/138, 254

[56] References Cited

U.S. PATENT DOCUMENTS

| | | | |
|---|---|---|---|
| 3,754,155 | 8/1973 | Oudef | 310/266 X |
| 4,217,508 | 8/1980 | Uzuka | 310/46 |
| 4,529,900 | 7/1985 | Uzuka | 310/266 X |
| 4,571,528 | 2/1986 | McGee et al. | 310/46 X |

Primary Examiner—Donovan F. Duggan
Attorney, Agent, or Firm—T. L. Peterson; J. S. Christopher

[57] ABSTRACT

An electronically commutated, collectorless direct current motor having a permanent magnet rotor comprised of a cup-shaped hollow cylinder in whose interior an internal magnetic yoke is arranged, an internal stator core and an external stator core. A stator drum winding comprises a plurality of phase windings wound on an insulating body with a portion of the stator winding being commingled with the phase windings in a plurality of slots of a slotted stator. The insulating body has a novel shape for arranging the stator winding thereon and for inserting the insulating body into a plurality of slots of the external stator core.

18 Claims, 10 Drawing Figures

FIG. 1
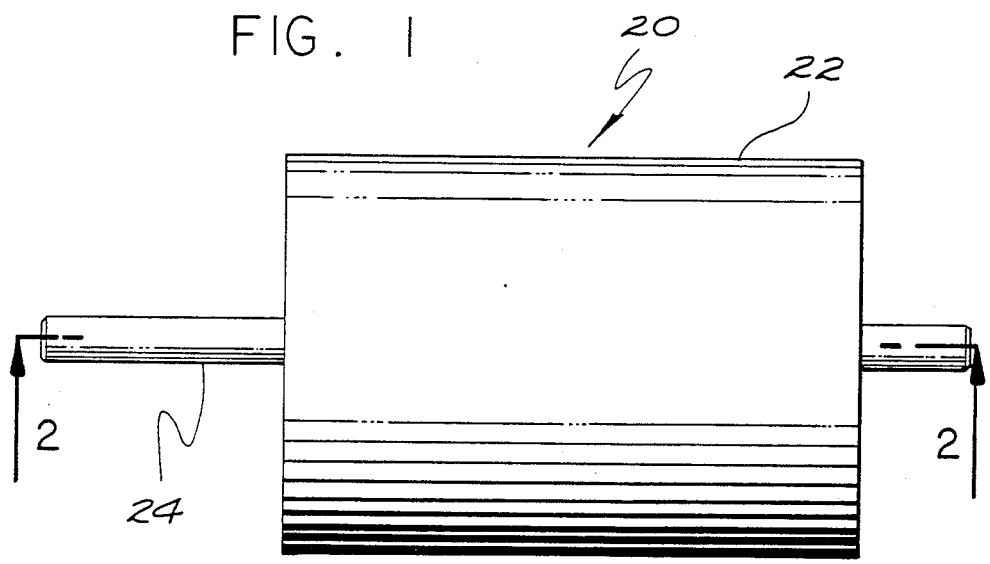
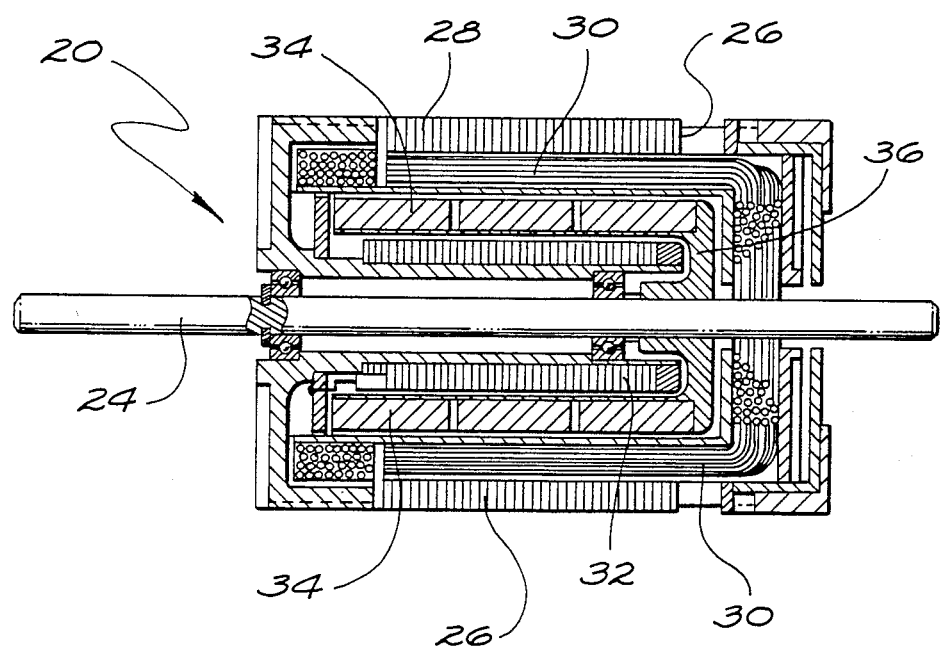
FIG. 2

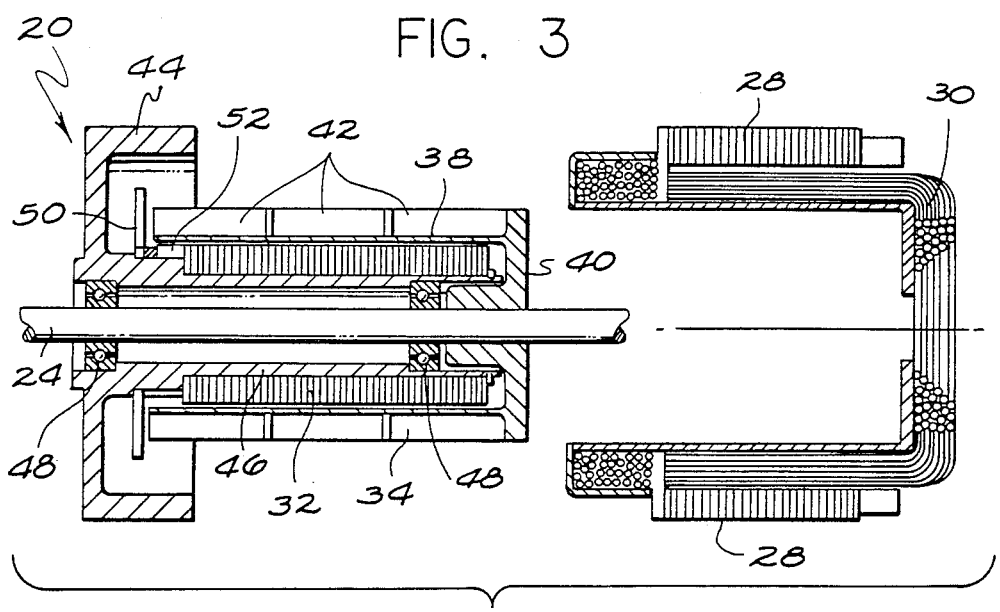
FIG. 3
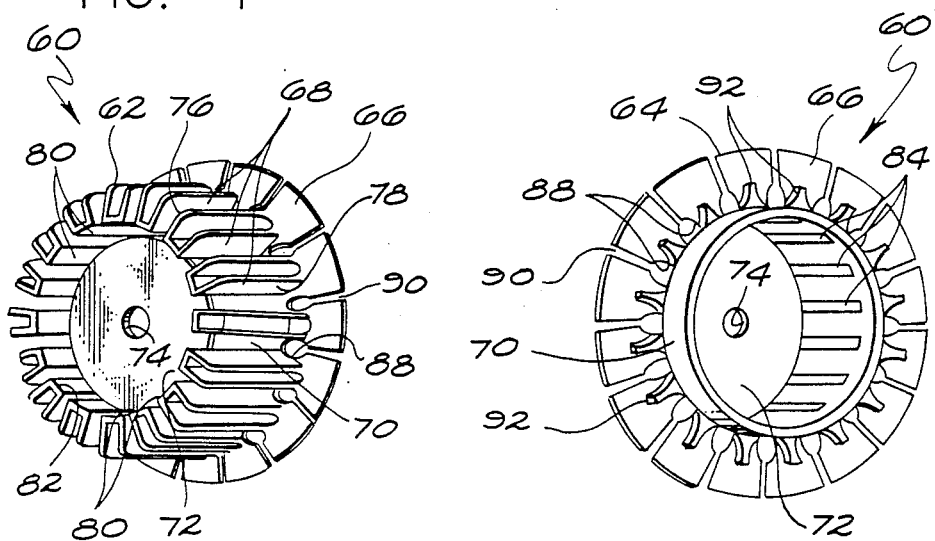
FIG. 4
FIG. 5

ELECTRONICALLY COMMUTATED, COLLECTORLESS DIRECT-CURRENT MOTOR

BACKGROUND OF THE INVENTION

1. Field of the Invention

The invention relates generally to direct current motors and more particularly to an electronically commutated, collectorless direct current motor having a multipolar, permanent magnet rotor and a multipart, multipolar stator winding wound on an insulating body surrounding the rotor.

2. Description of the Prior Art

In the field of rotating machinery, a direct current motor of the type described herein is known. A discussion of such a motor may be found in the German publication "Elektronikmotor $DM_c3$, ein neuer Kollektorloser Gleichstromkleinst Motor," Siemens— Zeitschrift, September, 1966, pp. 690–693. This prior art direct current motor was intended to be employed to drive battery powered devices such as portable tape records. In these drive motors, emphasis is placed primarily upon rotational speed stability during operation of the battery powered device. Note that electronically commutated direct current motors are presently being employed to an increasing degree in the field of data processing. The direct current motors employed for this application must be electronically commutated and must display good dynamic properties. Those properties include low rotor inertia which results in short starting and braking times while offering the highest possible operating torque.

A problem exists in that the prior art direct current motor does not possess the characteristics described herein. The prior art motor has a solid rotor leading to relatively poor dynamic operating properties. Further, because of weak magnetic coupling between the stator winding and the stator core, the motor has a relatively low efficiency factor.

SUMMARY OF THE PRESENT INVENTION

It is therefor an object of the present invention to provide an improved electronically commutated, collectorless direct current motor which simultaneously provides a high electrical efficiency factor and superior dynamic properties.

It is a further object to provide an improved electronically commutated, collectorless direct current motor which generates a high torque.

It is a further object to provide an improved electronically commutated, collectorless direct current motor which may be fabricated with greater cost effectiveness than comparable direct current motors heretofore available.

Briefly, a preferred embodiment of the present invention includes an electronically commutated, collectorless direct current motor having a rotor, an internal stator core and an external stator core. The rotor comprises a cup-shaped hollow cylinder in whose interior an internal magnetic yoke fabricated from dynamo sheet is arranged in a fixed manner. A stator winding designed in the form of a drum winding comprises a plurality of phase windings corresponding to a multiple of the number of poles. The stator winding is wound on an insulating body, a portion of the stator winding being arranged together with the phase windings in the slots of a slotted stator. The insulating body comprises a disk-shaped ring, one face of which contains an annularly arranged plurality of slotted portions whose number corresponds to the number of phase windings. The slotted portions are connected with a support disk which is displaced axially relative to the disk-shaped ring. The disk-shaped ring includes a plurality of openings having a plurality of vertically directed slots arranged radially and extending toward the outer perimeter of the disk shaped ring between the bases of the slotted portions. The disk-shaped ring also has a tubular section attached below the plurality of openings on an opposite face. The permanent-magnet rings are arranged.

An advantage of the electronically commutated, collectorless direct current motor is that the motor simultaneously provides a high electrical efficiency factor and superior dynamic properties.

Another advantage is that the electronically commutated, collectorless direct current motor generates a high torque.

A further advantage is that the electronically commutated, collectorless direct current motor can be fabricated with greater cost effectiveness than comparable direct current motors heretofore available.

These and other objects and advantages of the present invention will no doubt become obvious to those of ordinary skill in the art after having read the following detailed description of the preferred embodiment(s) which are illustrated in the various drawing figures.

IN THE DRAWING

FIG. 1 is a planar diagram of an electronically commutated, collectorless direct current motor in accordance with the present invention;

FIG. 2 is a longitudinal cross-sectional view of the electronically commutated, collectorless direct current motor taken along the line 2—2 of FIG. 1;

FIG. 3 is a partially exploded elevational view of the direct current motor illustrated in FIG. 2;

FIG. 4 is a perspective view of a first side of an insulating body incorporated within a stator winding circuit;

FIG. 5 is a perspective view of a second side of an insulating body incorporated within a stator winding circuit;

DETAILED DESCRIPTION OF THE PREFERRED EMBODIMENT

Figure 6:
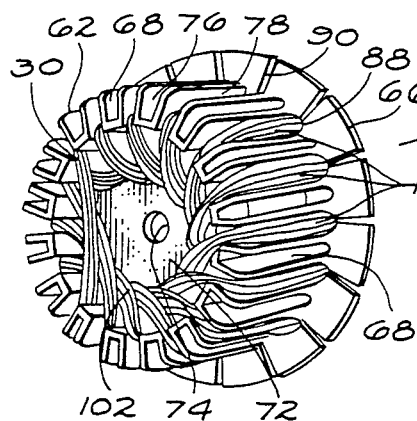
FIG. 6 is a perspective view of the first side of the insulating body illustrated in FIG. 4 including a plurality of stator windings.

FIG. 1 illustrated an electronically commutated, collectorless direct current motor referred to by the general reference character 20 and incorporating the present invention. The motor 20 includes an outer casing 22 and a motor shaft 24 extending from the casing 22. FIG. 2 illustrates a cross-section of FIG. 1 and further includes a stator 26 comprised of an external magnetic yoke 28, a stator drum winding 30 and an internal magnetic yoke 32. Both the external magnetic yoke 28 and the internal magnetic yoke 32 are comprised of a plurality of laminated dynamo sheets. Rotationally arranged between the stator drum winding 30 and the internal magnetic yoke 32 is a rotor 34 designed in the form of a cup-shaped hollow cylinder 36 and mechanically connected to the motor shaft 24. The exploded view of FIG. 3 further illustates the rotor 34 as comprising a cup 38 with a base 40. The base 40 simultaneously serves as a hub for rotor 34 and is fabricated from a non-magnetic material such as aluminum. Motor shaft 24 is attached within base 40 such as to prevent base 40 from rotating. A plurality of permanent magnets 42 are attached to the periphery of cup 38 as will be described in FIGS. 9 and 10. Rotor 34 overextends the stator 26 by employing an end shield 44 which includes an axially extending cylindrical tube 46. Arranged in cylindrical tube 46 are a plurality of ball bearings 48 for providing mounting support of the motor shaft 24 and rotor 34. Also arranged on cylindrical tube 46 is the internal magnetic yoke 32 which comprises the plurality of annular disk-shaped dynamo sheets.

Other facilities can additionally be attached to the end shield 44 such as a printed circuit board 50 which can contain the electrical circuitry or portion thereof required for control of the motor 20. Further, at least one rotary-position sensor 52 such as a Hall IC is arranged in the area of the rotor 34 which projects beyond the end of the internal magnetic yoke 32 within the stator 26. As can now clearly be seen from FIGS. 2 and 3, the motor 20 can easily be assembled such as to permit the individual, prefabricated components thereof such as end shield 44 with tube 46, internal magnetic yoke 32, rotor 34 and the external magnetic yoke 28 to be inserted and attached one within the other and connected one with the other.

FIGS. 4 to 7 illustrate the design of the stator drum winding 30. An insulating body 60 is employed for fabrication of the stator drum winding 30 with a first side 62 of the insulating body 60 being illustrated in FIG. 4 and a second side 64 being illustrated in FIG. 5. Insulating body 60 comprises a disk-shaped ring 66 which as can be seen from FIG. 4 has a plurality of annularly arranged, axially extending slotted portions 68 on the first side 62. The number of slotted portions 68 corresponds to a multiple of the number of pairs of poles of the motor 20. At a distance from ring 66, the slotted portions 68 are in a supporting relationship with a tubular section 70 (shown best in FIG. 5) on the second side 64 and with a support disk 72 on the first side 62. The support disk 72 is connected with the slotted portions 68 and is axially displaced relative to disk-shaped ring 66. The support disk 72 further includes a center hole 74 for inspection within the insulating body 60. The slotted portions 68 each include a pair of sidewalls 76 and 78 as well as a base 80 but only on the unsupported ends 82 beyond the support disk 72. In the area between disk-shaped ring 66 and support disk 72, the slotted portions 68 are comprised only of the sidewalls 76 and 78 which are arranged on the tubular section 70 such as to produce a slot-shaped opening 84 between each of the sidewalls 76 and 78 (see FIG. 5). In the assembled motor 20, the free ends of each of a plurality of teeth 86 of an external (stator core) magnetic yoke 28 are arranged in one of the slot-shaped openings 84. As can be seen from FIG. 5, the second side 64 of the disk-shaped ring 66 includes a plurality of openings 88 between the bases 80 of adjacent slotted portions 68. The openings 88 communicate with a plurality of vertically directed slots 90 which extend radially to the outside perimeter of the disk-shaped ring 66. One of a plurality of bridges 92 is arranged between each of the plurality of openings 88 for structural support. Moreover, a portion of the tubular section 70 projects beyond the disk-shaped ring 66 in the second side 64.

Figure 7:
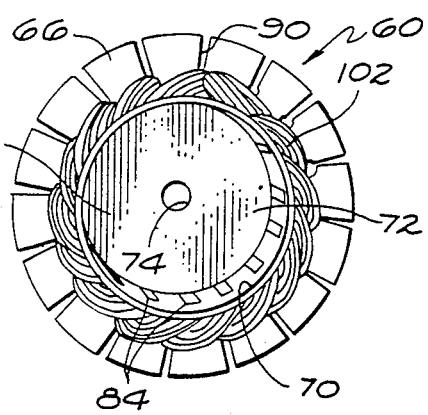
FIG. 7 is a perspective view of the second side of the insulating body illustrated in FIG. 5 including a plurality of stator windings.

FIGS. 6 and 7 depict duplicate illustrations of the insulating body 60 respectively as is shown in FIGS. 4 and 5; however, the insulating body 60 in FIGS. 6 and 7 includes the stator drum winding 30. A plurality of individual phase windings 100 of the stator drum winding 30 are located outside of each of the slotted portions 68. On the first side 62 of the stator drum winding 30 shown in FIG. 6, the individual phase windings 100 form an end winding 102 that is in a supporting relationship with support disk 72 and covers virtually the entire end surface thereof. The portion of the end winding 102 shown in FIG. 6 forms that portion of the stator 26 which is illustrated on the right-hand portion of FIGS. 2 and 3. On the second side 64 of the wound insulating body 60 illustrated in FIG. 6, the portion of tubular section 70 which projects beyond disk-shaped ring 66 prevents the end winding 102 which extends across adjacent openings 88 from entering into the area of an opening cross-section 104. The second side 64 of the stator drum winding 30 forms the portion of the stator 26 which is illustrated on the left-hand portion of FIGS. 2 and 3. The plurality of bridges 92 ensure that those openings 88 which have not yet been wound are covered by the end windings 102.

Figure 8:
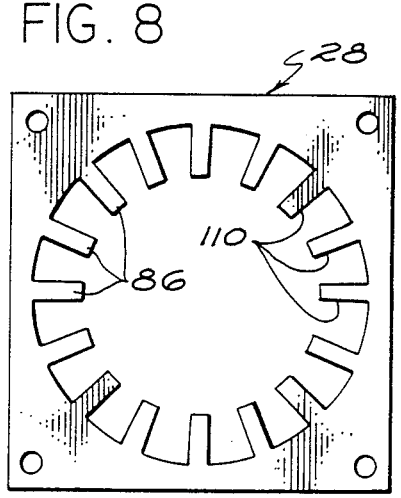
FIG. 8 is an elevational view illustrating the design of an external stator core.

When insulating body 60 has been wound in the manner illustrated in FIGS. 6 and 7, the body 60 is inserted with the stator drum winding 30 into the slotted external magnetic yoke 28 which is formed from a sheet stamping as is illustrated in FIG. 8. The sides of the slotted portions 68 are in a contacting relationship with the teeth 86 of the slotted sheet lamination of the external magnetic yoke 28 and also surround the phase windings 100. If the sidewalls 76 and 78 of the slotted portions 68 are designed with the appropriate width and flexibility, the slotted portions 68 can even cover the bases of a plurality of slots 110 in whose voids the plurality of individual phase windings 100 of the stator drum winding 30 are located.

Figure 9:
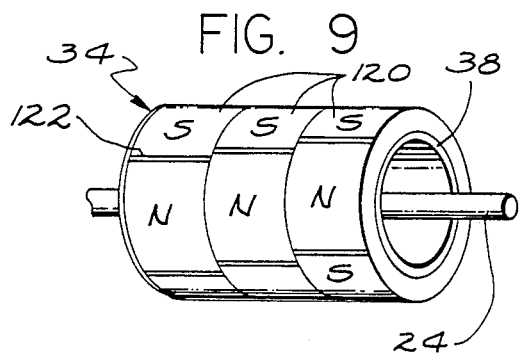
FIG. 9 is a perspective view of the preferred embodiment of a rotor circuit of the direct current motor.
Figure 10:
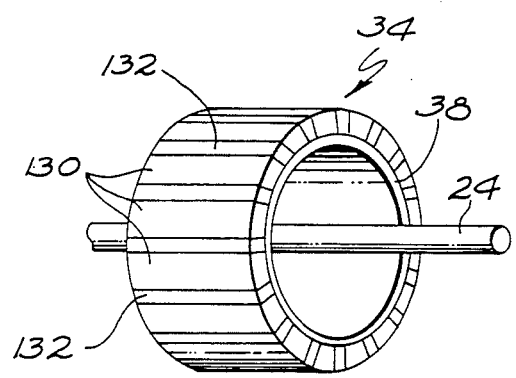
FIG. 10 is a perspective view of an alternative embodiment of a rotor circuit of the direct current motor.

FIGS. 9 and 10 illustrate two different embodiments of the rotor 34. FIG. 9 shows a first practical example which is a preferred embodiment of rotor 34 and includes a plurality of radially magnetized permanent-magnet rings (or shells) 120 which are attached or bonded to the periphery of cup 38 in the indicated manner. Each of a plurality of gaps 122 existing between the permanent-magnet rings 120 is filled with a non-magnetic material such as plastic. FIG. 10 shows a second practical example which is an alternative embodiment of rotor 34 and includes a plurality of radially magnetized permanent-magnet rectangular parallelepipeds 130 which are attached to the periphery of the cup 38. Each of a plurality of gaps 132 located between the rectangular parallelepipeds 130 is filled with the non-magnetic plastic material.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An electronically commutated, collectorless direct current motor comprising, in combination:
   a stator comprised of an external magnetic yoke, a stator winding and an internal magnetic yoke;
   a rotor rotationally arranged between the stator winding and the internal magnetic yoke, the rotor being a permanent magnet rotor and designed in the form of a cup-shaped hollow cylinder comprised of a non-magnetic material and mechanically connected to a motor shaft;
   an insulating body employed in the fabrication of the stator winding, said insulating body having a first side and a second side;
   a disk-shaped ring connected to said insulating body and having a plurality of annularly arranged, axially extending slotted portions on said first side, the number of said slotted portions being a multiple of the number of pole pairs of said motor;
   a pair of sidewalls mechanically connected to each of said slotted portions for structurally supporting a plurality of phase windings of the stator winding outside each slotted portion and between said sidewalls of adjacent slotted portions and on a portion of a tubular section of said first side; and
   a slot-shaped opening formed within each of said slotted portions between each pair of sidewalls for receiving one of a plurality of teeth of said external magnetic yoke for completing the magnetic circuit of the stator, the second side of said insulating body further including a plurality of openings communicating with a plurality of vertically directed slots and a plurality of bridges in said disk-shaped ring for providing a distribution path for said phase windings.

2. The electronically commutated, collectorless direct current motor of claim 1 wherein said stator winding is a drum type winding.

3. The electronically commutated, collectorless direct current motor of claim 1 wherein said external magnetic yoke comprises a plurality of laminated dynamo sheets.

4. The electronically commutated, collectorless direct current motor of claim 1 wherein said internal magnetic yoke comprises a plurality of laminated dynamo sheets.

5. The electronically commutated, collectorless direct current motor of claim 1 wherein said cup-shaped hollow cylinder of the rotor further includes a cup and a base, said base serving as a hub for said rotor and being fabricated from a non-magnetic material.

6. The electronically commutated, collectorless direct current motor of claim 1 further including an end shield and an axially extending cylindrical tube, each connected to said rotor for permitting said rotor to overextend said stator.

7. The electronically commutated, collectorless direct current motor of claim 6 further including a printed circuit board connected to said end shield for providing the electrical control circuitry of the direct current motor.

8. The electronically commutated, collectorless direct current motor of claim 6 further including at least one rotary position sensor arranged in the area in which the rotor overextends the stator, said sensor for determining the position of said rotor with respect to said stator.

9. The electronically commutated, collectorless direct current motor of claim 8 wherein said rotary position sensor is a Hall integrated circuit.

10. The electronically commutated, collectorless direct current motor of claim 1 wherein said motor shaft and said rotor are supported by a set of ball bearings mounted within an axially extending cylindrical tube connected to an end shield o the rotor circuit, the outer periphery of said cylindrical tube further supporting the internal magnetic yoke.

11. The electronically commutated, collectorless direct current motor of claim 1 wherein the motor is comprised of a plurality of prefabricated components designed to be connectable and disconnectable from corresponding components.

12. The electronically commutated, collectorless direct current motor of claim 1 wherein each of said plurality of slotted portions are structurally supported by a support disk mounted on said first side and by a tubular section on said second side of the insulating body, said supprt disk being mechanically connected to each of said slotted portions and axially displaced from said disk-shaped ring.

13. The electronically commutated, collectorless direct current motor of claim 12 wherein said support disk further includes a center hole for inspecting the interior of said insulating body.

14. The electronically commutated, collectorless direct current motor of claim 1 wherein said plurality of openings are located in said disk-shaped ring above the intersecion of the disk-shaped ring with said tubular section, said openings intersect said vertically directed slots which extend radially to the outside perimeter of the disk-shaped ring.

15. The electronically commutated, collectorless direct current motor of claim 1 wherein said plurality of bridges provide structural support to the insulating body and further ensures that said plurality of openings are covered by an end winding formed by the individual phase windings.

16. The electronically commutated, collectorless direct current motor of claim 1 wherein a portion of said tubular section projects beyond said disk-shaped ring into said second side for preventing an end winding extending across adjacent openings of said plurality of openings from entering into an open cross-section area adjacent to a support disk, said support disk being axially displaced from said disk-shaped ring on said first side.

17. The electronically commutated, collectorless direct current motor of claim 1 wherein said rotor comprises a plurality of radially magnetized permanent magnet rings bonded to the periphery of said cup-shaped hollow cylinder, said hollow cylinder being fabricated from a non-magnetic material.

18. The electronically commutated, collectorless direct current motor of claim 1 wherein said rotor comprises a plurality of radially magnetized permanent magnet rectangular parallelepipeds attached to the periphery of said cup-shaped hollow cylinder, said hollow cylinder being fabricated from a non-magnetic material.

* * * * *